United States Patent
Veige et al.

(10) Patent No.: US 11,241,681 B2
(45) Date of Patent: Feb. 8, 2022

(54) CATALYST FOR RING EXPANSION METATHESIS POLYMERIZATION OF CYCLIC MONOMERS

(71) Applicant: University of Florida Research Foundation, Inc., Gainesville, FL (US)

(72) Inventors: Adam S. Veige, Gainesville, FL (US); Stella Almeida Gonsales, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 52 days.

(21) Appl. No.: 16/806,054

(22) Filed: Mar. 2, 2020

(65) Prior Publication Data

US 2020/0276566 A1    Sep. 3, 2020

Related U.S. Application Data

(62) Division of application No. 15/760,730, filed as application No. PCT/US2016/052437 on Sep. 19, 2016, now Pat. No. 10,639,620.

(Continued)

(51) Int. Cl.
*C08F 32/04* (2006.01)
*C08F 4/69* (2006.01)
(Continued)

(52) U.S. Cl.
CPC ........ *B01J 31/223* (2013.01); *B01J 31/2243* (2013.01); *B01J 31/2265* (2013.01); *B01J 31/2286* (2013.01); *C07F 11/00* (2013.01); *C08F 4/69* (2013.01); *C08F 32/04* (2013.01); *C08G 61/08* (2013.01); *B01J 2231/14* (2013.01); *B01J 2231/543* (2013.01); *B01J 2531/0244* (2013.01); *B01J 2531/66* (2013.01);
(Continued)

(58) Field of Classification Search
CPC ........ C08F 32/04; C08F 4/69; C08F 4/69206; C08F 4/78
USPC ........................................................ 526/281
See application file for complete search history.

(56) References Cited

U.S. PATENT DOCUMENTS

| | | | |
|---|---|---|---|
| 10,730,972 B2 * | 8/2020 | Veige | C08F 138/00 |
| 2014/0073800 A1 | 3/2014 | Veige et al. | |
| 2014/0309389 A1 | 10/2014 | Veige et al. | |

FOREIGN PATENT DOCUMENTS

| | | |
|---|---|---|
| WO | WO-2004/013198 A2 | 2/2004 |
| WO | WO-2013/085707 A1 | 6/2013 |

OTHER PUBLICATIONS

Gonsales, S.A.; Kubo, T.; Flint, M.L.; Abboud, K.A.; Sumerlin, B.S.; Veige, A.S. J.Am.Chem.Soc. 2016, 138, 4996-4999. (Year: 2016).*

(Continued)

*Primary Examiner* — Rip A Lee
(74) *Attorney, Agent, or Firm* — Marshall, Gerstein & Borun LLP

(57) ABSTRACT

A tetraanionic OCO pincer ligand metal-oxo-alkylidene complex is prepared from a trianionic pincer ligand supported metal-alkylidyne. The metal can be tungsten or other group 5-7 transition metal. The tetraanionic pincer ligand metal-oxo-alkylidene complex, a trianionic OCO pincer ligand metal complex, or a trianionic ONO pincer ligand metal complex can be used to polymerize cycloalkenes. The poly(cycloalkene)s are predominantly cis-alkene macrocyclics.

10 Claims, 10 Drawing Sheets

Related U.S. Application Data

(60) Provisional application No. 62/220,569, filed on Sep. 18, 2015.

(51) Int. Cl.
    *C08F 4/78* (2006.01)
    *B01J 31/22* (2006.01)
    *C08G 61/08* (2006.01)
    *C07F 11/00* (2006.01)

(52) U.S. Cl.
    CPC ...... *B01J 2540/10* (2013.01); *B01J 2540/225* (2013.01); *C08F 4/69206* (2013.01); *C08F 4/78* (2013.01); *C08G 2261/13* (2013.01); *C08G 2261/3324* (2013.01); *C08G 2261/418* (2013.01)

(56) References Cited

OTHER PUBLICATIONS

Boydston, A.J.; Xia, Y.; Kornfield, J.A.; Gorodetskaya, I.A., Grubbs, R.H. J.Am.Chem.Soc. 2008, 130, 12775-12782. (Year: 2008).*

Bailey, B. C. et al., "Snapshots of an Alkylidyne for Nitride Triple-Bond Metathesis," *J. Am. Chem. Soc.*, 2007, 129, No. 8, pp. 2234-2235.

Bielawski, C. W. et al., "An "Endless" Route to Cyclic Polymers," *Science*, Sep. 20, 2002, vol. 297, No. 5589, pp. 2041-2044.

Bielawski, C. W. et al., "Synthesis of Cyclic Polybutadiene via Ring-Opening Metathesis Polymerization: The Importantance of Removing Trace Linear Contaminants," *J. Am. Chem. Soc.*, 2003, vol. 125, No. 28, pp. 8424-8425.

Boydston, A. J. et al., "Cyclic Ruthenium-Alkylidene Catalysts for Ring-Expansion Metathesis Polymerization," *J. Am. Chem. Soc.*, Sep. 24, 2008, vol. 130, No. 38, pp. 12775-12782.

Ciszewski, J. T. et al., "Synthesis and structure of an imido-tethered Schrock carbene of molybdenum," *Dalton Transactions*, 2003, pp. 4226-4227.

Floros, C. et al., "Ring opening metathesis polymerization of norbornene and derivatives by the triply bonded ditungsten complex Na[W2(?-Cl)3C14(THF)2](THF)3", *Polymers*, 2012, vol. 4, No. 4, pp. 1657-1673.

Geyer, A. M. et al., "Catalytic Nitrile-Alkyne Cross-Metathesis," *J. Am. Chem. Soc.*, 2007, vol. 129, pp. 3800-3801.

Gonsales, S. A. et al., "Fast "wittig-like" Reactions as a Consequence of the Inorganic Enamine Effect," *J. Am Chem. Soc.*, Mar. 20, 2015, vol. 137, No. 14, pp. 4840-4845.

Gonsales, S. A. et al., "Highly Tactic Cyclic Polynorbornene: Stereoselective Ring Expansion Metathesis Polymerization of Norbornene Catalyzed by a New Tethered Tungsten-Alkylidene Catalyst," *J. Am. Chem. Soc.*, 2016, 138, 4996-99.

Hyvl et al., "Proof of Tacticity of Stereoregular ROMP Polymers through Post Polymerization Modification," *5 Macromolecules,*, 2015, vol. 48, pp. 3148-3152.

International Preliminary Report on Patentability, Chapter I, for International Application No. PCT/US2016/052437, dated Mar. 20, 2018.

International Search Report and Written Opinion of the International Searching Authority, for International Application No. PCT/US2016/052437, dated Jan. 3, 2017.

Jan, M. T. et al., "Synthesis and characterization of a trianionic pincer supported Mo-alkylidene anion and alkyne insertion into a Mo(IV)-$C_{pincer}$ bond to form metallocyclopropene ($n^2$-vinyl) complexes," *J. Organomet. Chem.*, 2011, vol. 696, pp. 4079-4089.

Katz, T. J. et al., "Polymerization of Acetylenes and Cyclic Olefins Induced by Metal Carbynes," *J. Am. Chem. Soc.*, 1984, vol. 106, pp. 2659-2668.

Kuppuswamy, S. et al., "Synthesis and Characterization of Tungsten(VI) Alkylidene Complexes Supported by an [OCO]$_3$ Trianionic Pincer Ligand: Progress towards the [BuOCO]W≡CC(CH$_3$)$_3$ Fragment," *Organometallics*, 2010, vol. 29, pp. 4227-4233.

Lokare, K. S. et al., Synthesis, Properties, and Structure of Tethered Molybdenum Alkylidenes, *Organometallics*, 2008, vol. 27, No. 19, pp. 5130-5138.

Meng, X. et al., "Vinyl and Ring-Opening Metathesis Polymerization of Norbornene with Novel Hall-Sandwich Iridium (III) Complexes Bearing Hydroxyindanimine Ligands," *Chemical Communications*, 2008, vol. 27, pp. 3178-3180.

Mortreaux, A. et al. "Reactions of W(CCMe$_3$) (OCMe$_3$)$_3$ with terminal alkynes: metathesis and polymerization," *Journal of Molecular Catalysis A: Chemical*, 1995, vol. 96, pp. 95-105.

Nadif, S. S. et al., Introducing "ynene" metathesis: ring-expansion metathesis polymerization (REMP) leads to highly cis and syndiotactic cyclic polymers or norbornene, *J. Am. Chem. Soc.*, 2016, vol. 138, pp. 6408-6411.

Sarkar, S. et al., "Additional of Mild Electrophiles to a Mo≡N Triple Bond and Nitrile Systhesis via Metal-Mediated N-Atom Transfer to Acid Chlorides," J. Am. Chem. Soc., 2008, vol. 130, pp. 16128-16129.

Sarkar, S. et al., "An OCO3-trianionic pincer tungsten (VI)alkylidyne: rational design of a highly active alkyne polymerization catalyst," *J. Am. Chem. Soc.*, 2012, vol. 134, No. 10, pp. 4509-4512.

Sarkar, S. et al., "Synthesis, Characterization, and Reactivity of a d$^2$, Mo(IV) Complex Supported by a New OCO-Trianionic Pincer Ligand," *J. Am. Chem. Soc.*, 2008, vol. 130, pp. 1116-1117.

* cited by examiner

CATALYST FOR RING EXPANSION METATHESIS POLYMERIZATION OF CYCLIC MONOMERS

CROSS-REFERENCE TO RELATED APPLICATIONS

This application is a U.S. Divisional patent application of Ser. No. 15/760,730, filed Mar. 16, 2018, now issued as U.S. Pat. No. 10,639,620, which in turn is a U.S. national stage application of International patent application No. PCT/US2016/052437, filed Sep. 19, 2016, which claims the benefit of U.S. Provisional Application Ser. No. 62/220,569, filed Sep. 18, 2015, the disclosures of which are hereby incorporated by reference in their entireties, including all figures, tables and drawings.

This invention was made with government support under CHE-1265993 awarded by the National Science Foundation. The government has certain rights in the invention.

BACKGROUND OF INVENTION

The ring-expansion metathesis polymerization of cycloalkenes has received significant attention. This polymerization is documented, for example in Bielawski et al., Science 2002, 297, 2041-44. Recently, Veige et al. U.S. Patent Application Publication No. 2014/0309389 discloses tridentate pincer ligand supported metal complex of a group 5-7 transition metals that initiate polymerization of alkynes in high yield to macrocyclic polyalkynes. Metal complexes that polymerize alkenes to yield cyclic polyalkenes are desirable. Cyclic norbornene-based macromonomers were polymerized via REMP using cyclic ruthenium catalysts, as described by Boydston et al., J. Am. Chem. Soc. 2008, 130, 12775-82. However, control over both tacticity and the cis/trans ratio is either not reported or is absent. Hence, effective catalysts for the preparation of polymers by stereo-controlled ring-expansion metathesis polymerization are desirable.

SUMMARY OF THE INVENTION

An embodiment of the invention is directed toward a tetraanionic pincer ligand metal-oxo-alkylidene complex of the structure:

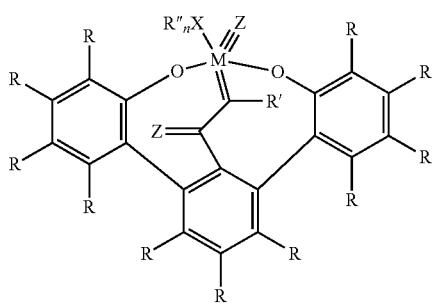

where: Z is independently O or S; R comprises, independently, H, methyl, ethyl, n-propyl, i-propyl, n-butyl, i-butyl t-butyl, or larger alkyl; R' is methyl, ethyl, n-propyl, i-propyl, n-butyl, i-butyl, t-butyl, $C_5$-$C_{22}$ alkyl, phenyl, naphthyl, or $C_{13}$-$C_{22}$ aryl; X is O, N, S, P, or Se; R'', independently, is methyl, ethyl, n-propyl, i-propyl, n-butyl, i-butyl, t-butyl, $C_5$-$C_{22}$, phenyl, naphthyl, $C_{13}$-$C_{22}$ aryl, or two R'' is a $C_4$-$C_6$ alkylene combined with a single X as a heterocycle; n is 1 to 3; and M is a group 5-7 transition metal. A representative tetraanionic pincer ligand metal-oxo-alkylidene complex has the structure:

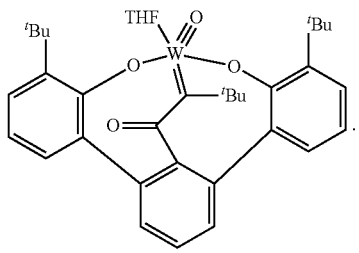

The tetraanionic pincer ligand metal-oxo-alkylidene complex can be prepared from the reaction of a trianionic OCO pincer ligand supported metal-alkylidyne complex with carbon dioxide or carbon disulfide.

In embodiments of the invention, the tetraanionic OCO pincer ligand metal-oxo-alkylidene complex, a trianionic OCO pincer ligand metal complex, or a trianionic ONO pincer ligand metal complex can be combined with a plurality of cyclic alkene monomers to yield a plurality of cyclic poly(alkene).

In an embodiment of the invention the trianionic OCO pincer ligand metal complex has the structure:

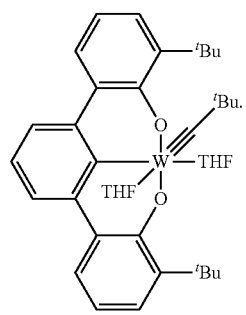

In another embodiment of the invention, the trianionic ONO pincer ligand metal complex has the structure:

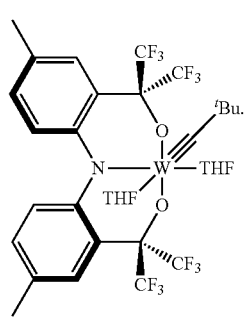

Cyclic monomers that can be employed are unsubstituted or substituted cyclopropene, cyclobutene, cyclopentene, cycloheptene, and cyclooctene, norbornene, dicyclopentadiene, norbornene anhydride, diester from norbornene anhydride, imide from norbornene anhydride, oxanorbornene, oxanorbornene anhydride, ester of oxanorbornene anhydride, and imide of oxanorbornene anhydride, or any combination thereof, wherein the ester is from a $C_1$-$C_{10}$ alkyl or aryl alcohol, the imides is from $C_1$-$C_{10}$ alkyl or aryl amine; wherein substituents can be $C_1$-$C_{10}$ alkyl, aryl, $C_1$-$C_{10}$ alkoxy, aryloxy, $C_1$-$C_{10}$ carboxylic acid ester, or carboxylic acid amide, optionally substituted one or two times with $C_1$-$C_{10}$ alkyl or aryl.

Polymerization by ring expansion metathesis polymerization can result in stereorandom or stereoregular cyclic polymers. A stereoregular cyclic polynorbornene can be formed with repeating units having greater than 95% cis content and greater than 95 percent syndiotactic content.

DETAILED DISCLOSURE

Figure 1:
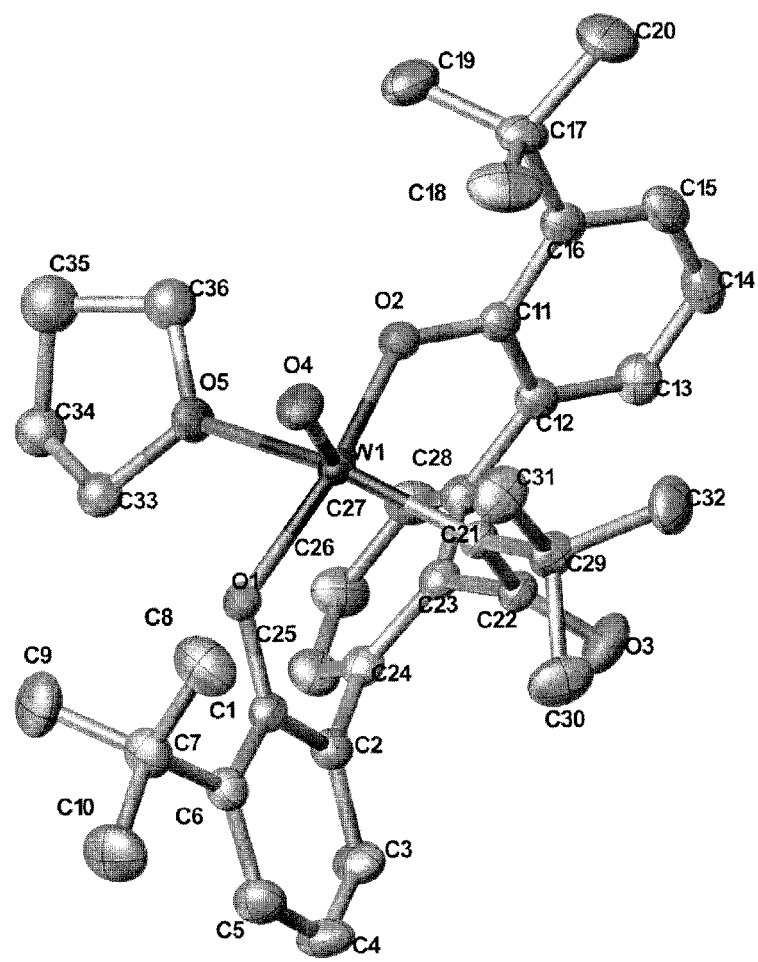
FIG. 1 shows the crystal structures of OCO tungsten complex 2, according to an embodiment of the invention, as determined by a single crystal X-ray diffraction experiment.

An embodiment of the invention is directed to tetraanionic pincer ligand metal-oxo-alkylidene complexes of the structure:

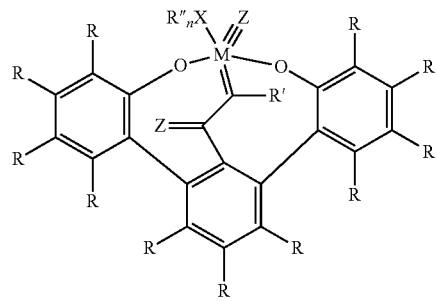

where: Z is independently O or S; R is, independently, H, methyl, ethyl, n-propyl, i-propyl, n-butyl, i-butyl t-butyl, or larger alkyl, or any other substituent that does not inhibit formation of the tetraanionic pincer ligand supported metal-alkylidyne complex; R' is methyl, ethyl, n-propyl, i-propyl, n-butyl, i-butyl, t-butyl, $C_5$-$C_{22}$ alkyl, phenyl, naphthyl, or $C_{13}$-$C_{22}$ aryl; X, independently, can be O, N, S, P, or Se; R", independently, is methyl, ethyl, n-propyl, i-propyl, n-butyl, i-butyl, t-butyl, $C_5$-$C_{22}$, phenyl, naphthyl, $C_{13}$-$C_{22}$ aryl, or two R" is a $C_4$-$C_6$ alkylene combined with a single X as a heterocycle; n is 1 to 3 depending on X; and M is a group 5-7 transition metal.

The OCO pincer ligand contains three anionic donor atoms that complex the metal ion. The tetraanionic pincer ligand metal-oxo-alkylidene complex is generated by the addition of carbon dioxide, carbon disulfide, or, effectively, cabonoxidesulfide to a trianionic pincer ligand supported metal-alkylidyne complex where the trianionic pincer ligand results from a precursor with the structure:

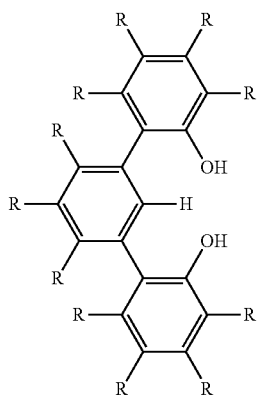

where R groups at carbons 3, 4, 5, 6, 4', 5', 6', 3", 4", 5" and 6" of the 1,1':3',1" terphenyl assembly can be H, or substituted, with an alkyl group, such as methyl, ethyl, n-propyl, propyl, n-butyl, i-butyl, t-butyl, or larger alkyl group, for example $C_5$-$C_{20}$, or any other substituents that do not compete for the formation of an M≡C bond of a synthetic precursor trianionic pincer ligand supported metal-alkylidyne complex. For example, a substituent that can form a chelate toward the metal, alone or in combination with one of the OH groups of the OCO pincer ligand can be included. Among the other substituents on the OCO pincer ligand, R may be groups that permit the attachment of the OCO pincer ligand, a precursor trianionic pincer ligand supported metal-alkylidyne complex prepared therefrom, or a trianionic pincer ligand metal-oxo-alkylidene complex prepared therefrom to a polymer or resin, for example a carboxylic acid, carboxylic ester, amine, thiol, epoxy, haloalkyl, hydroxy, or other reactive group in the 4, 5, 5', 4", or 5" positions. Large R groups at carbons 6, 4', 6', and 6" of the OCO pincer ligand precursor can oblige the aromatic rings to be out of plane to a significant degree and inhibit the formation of the desired precursor trianionic pincer ligand supported metal-alkylidyne complex, and, generally, are not appropriate for preparation of the trianionic pincer ligand supported metal-oxo-alkylidene complexes, according to embodiments of the invention.

In an exemplary embodiment of the invention, as shown in Scheme 1, below, a tetraanionic OCO pincer ligand tungsten-oxo-alkylidene complex 2 and a dinuclear species 3 are synthesized from a trianionic pincer ligand supported tungsten-alkylidyne complex 1 upon reaction with carbon dioxide in a 9:2 ratio.

Scheme 1

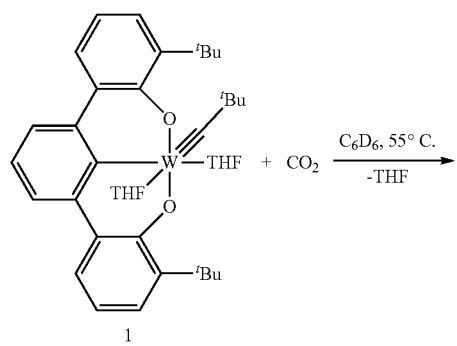

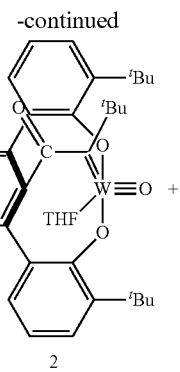

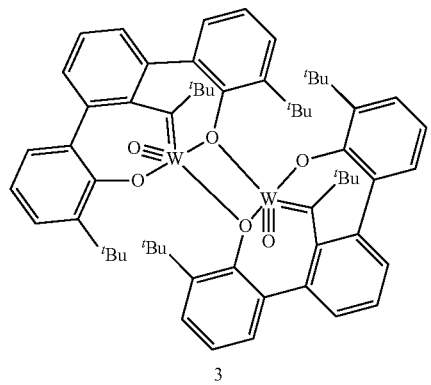

Complex 2 crystallizes preferentially in $C_6D_6$, resulting in single crystals amenable to X-ray diffraction. The tungsten ion in complex 2, as shown in FIG. 1, is square pyramidal (τ=0.12). The oxo group occupies the axial position (W1-O4=1.6948(15) Å) and the alkylidene (W1=C21=1.9503(19) Å), a THF ligand, and two aryloxides reside in the basal plane.

Figure 2:
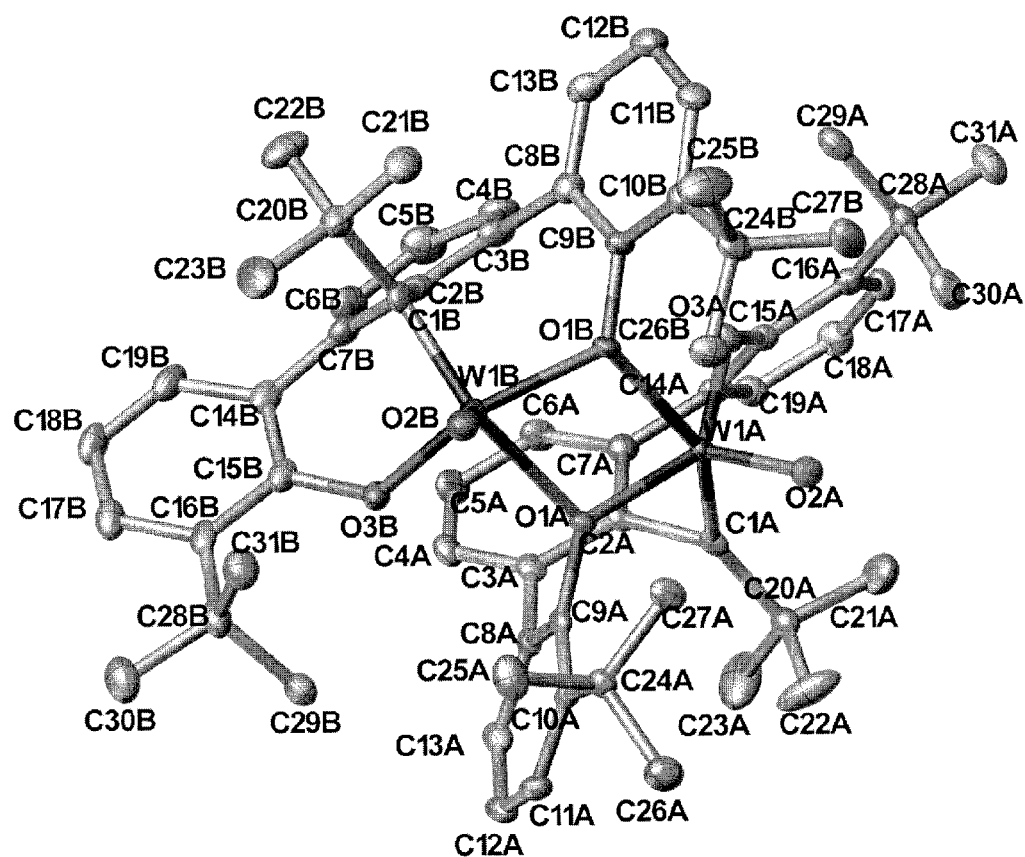
FIG. 2 shows the crystal structures of OCO tungsten complex 3, according to an embodiment of the invention, as determined by a single crystal X-ray diffraction experiment.

Complex 3 results from complex 2 by the loss of CO and tetrahydrofuran (THF). Upon extensive heating of the reaction mixture, complete conversion of 2 to 3 is possible. Slow evaporation of a concentrated solution of 3 in a pentane/$Et_2O$ mixture yields single crystals suitable for X-ray diffraction, as shown in FIG. 2. One of the aryloxides from the trianionic $OCO^{3-}$ pincer ligand bridges the two tungsten atoms. The conversion of 2 to 3 can be suppressed in the reaction mixture by the inclusion of THF in solution.

In an embodiment of the invention, complex 2 is employed as catalyst for ring-expansion metathesis polymerization of cycloalkenes. In an embodiment of the invention, complex 3 is employed as catalyst for ring-expansion metathesis polymerization of cycloalkenes to generate a cyclic polyalkene. In other embodiments of the invention, a trianionic pincer-supported metal alkylidyne, where the metal is a group 5-7 transition metal, is employed as a catalyst in a method for ring-expansion metathesis polymerization of cycloalkenes. The trianionic pincer ligand precursor has the structure:

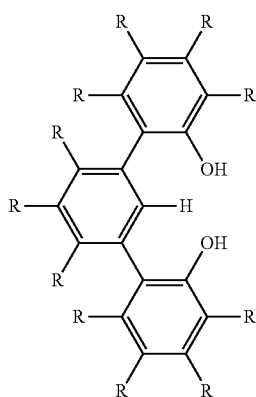

where R groups at carbons 3, 4, 5, 6, 4', 5', 6', 3", 4", 5" and 6" of the 1,1':3',1" terphenyl assembly can be H, or substituted, with an alkyl group, such as methyl, ethyl, n-propyl, propyl, n-butyl, i-butyl, t-butyl, or larger alkyl group, for example $C_5$-$C_{20}$, or any other substituents that do not compete for the formation of an M≡C bond of a synthetic precursor trianionic pincer ligand supported metal-alkylidyne complex. The trianionic pincer ligand can be an $OCO^{3-}$ pincer ligand, as in 1, or, in an embodiment of the invention, an $ONO^{3-}$ pincer ligand. The $ONO^{3-}$ pincer ligand can be of the structure derived from the protonated precursor:

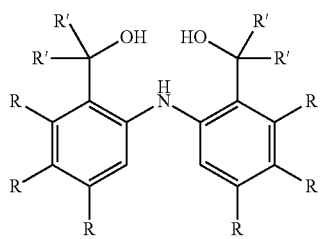

R groups and R' groups where X is C are independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$, $C_3$-$C_{30}$ polyether, $C_3$-$C_{30}$ polyetherester, $C_3$-$C_{30}$ polyester, or arylalkenyl, $C_8$-$C_{30}$ arylalkynyl, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylesterperfluorinated, partially fluorinated, and/or otherwise substituted variations thereof.

According to an embodiment of the invention, cyclic poly(cycloalkene)s can be homopolymers or copolymers of a plurality of cyclic alkene monomers where the catalyst functions as the initiator of the polymerization. Cyclic polymers can be prepared from a wide variety of cycloalkene monomers, including, but not limited to, monocyclic alkenes, such as, but not limited to cyclopropene, cyclobutene, cyclopentene, cycloheptene, and cyclooctene, and substituted variations thereof, bicycloalkenes, such as, but not limited to, norbornene, dicyclopentadiene, norbornene anhydride, esters from norbornene anhydride, imides from norbornene anhydride, oxanorbornene, oxanorbornene, esters of oxanorbornene anhydride, and imides of oxanorbornene anhydride. The imides can be imides from alkyl or aryl amines, which can be substituted or unsubstituted. Substituents can be $C_1$-$C_{10}$ alkyl, aryl, alkoxy, carboxylic acid ester, carboxylic acid amide, where the amide is optionally substituted one or two times with an alkyl or aryl. Cyclic polymers can be prepared that are copolymers of two or more monomers. The molecular weight of the cyclic polymers can be small, equivalent to oligomers of three to ten repeating units, or the molecular weights can be of any size up to tens and hundreds of thousands in molecular weight. The cyclic poly(cycloalkene)s can be used as prepared or converted into cyclic poly(cycloalkane)s upon reduction of the double bonds of the cyclic poly(cycloalkene)s polymer. The cyclic poly(cycloalkene)s can be converted to substituted cyclic poly(cycloalkane)s by addition reaction at the alkene groups of the cyclic poly(cycloalkene)s, for example the addition of halogens, alcohols, amines, or any other olefin addition reactions. The macrocyclic polymers can find many applications, such as part of motor oil additives or other lubricants.

Depending on the catalyst employed, the stereochemistry of polymerization varies. For example, the cyclic polymer can be atactic in monomer placement with approximately 61% cis content with catalyst 4 but in excess of 99% cis content and more than 95% syndiotactic when complex 1 or complex 2 is employed as the catalytic initiator, according to embodiments of the invention.

Figure 3:
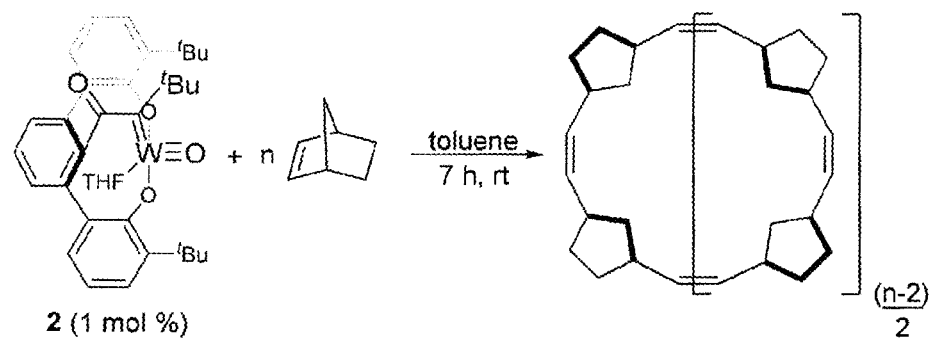
FIG. 3 shows a reaction scheme for the stereoregular polymerization of norbornene with complex 2, according to an embodiment of the invention.

In an exemplary polymerization, as shown in FIG. 3, initiating catalyst 2 at 1 mol % with norbornene at room temperature yields cis-selective cyclic polynorbornene (>98% by $^1$H NMR spectroscopy) after 7 h. The reaction was quenched by dropwise addition of the reaction mixture into stirring methanol. The resulting polymer was isolated by filtration and dried under vacuum. Complex 3 when mixed at 1 mol % with NBE at room temperature for 7 h yields polynorbornene in only 42% yield, with no cis-selectivity. Table 1, below, lists polymerization results as a function of the ratio of monomer to catalyst.

A mixture of 2 and 3 maintains the selectivity of 2 when treated with norbornene, suggesting initiation with catalyst 2 and propagation of the monomer are much faster than initiation by the more hindered complex 3. Evidence for fast propagation relative to initiation comes from a sealed NMR tube polymerization experiment. Combining norbornene and 2 in $C_6D_6$ results in polymer formation but the $^1$H NMR spectrum of the reaction mixture exhibits signals attributable to unreacted catalyst 2. Cyclic polynorbonene produced with catalyst 2 is syndiotactic (>98%), as determined by a comparison to $^{13}$C NMR data of previously reported syndiotactic linear polynorbornene.

TABLE 1

Polymerization of norbornene[a] by catalyst 2 with different monomer/catalyst ratio

| [mon/cat]$_0$ | [monomer]$_0$[b] | yield (%) | % cis[c] | $M_n$[d] (kDa) | $M_w/M_n$[d] |
|---|---|---|---|---|---|
| 25:1 | 0.1 | 97 | 97 | 126 | 1.24 |
| 50:1 | 0.1 | 97 | 97 | 197 | 1.25 |
| 100:1 | 0.1 | 92 | 98 | 248 | 1.21 |
| 200:1 | 0.1 | 60 | 97 | 578 | 1.29 |

[a]The appropriate amount of a 1 mg/mL solution of catalyst dissolved in toluene is added to 40 mg of norbornene dissolved in toluene and stirred for 7 h at room temperature.
[b]mol · L$^{-1}$.
[c]Determined by $^1$H NMR spectroscopy.
[d]Determined by size exclusion chromatography.

Size exclusion chromatography (SEC) equipped with multi-angle light scattering (MALS) and viscosity detectors provide compelling data for a cyclic topology for polynorbornene from complex 2. Cyclic polymers have lower intrinsic viscosities and smaller hydrodynamic volumes than their linear analogs. Catalyst that produce linear polynorbonene with high cis selectivity (>95%) and syndiotacticity (>95%) are known, and a sample was synthesized utilizing Grubbs catalyst Ru(NHC(Ad)(Mes))(=CH(PhO$^i$Pr))($\eta^2$-NO$_3$) (6).

TABLE 2

$M_n$, $M_w/M_n$, cis-selectivity and tacticity of cyclic/linear poly(NBE).

| Catalyst | $M_n^{[a]}$ (kDa) | $M_w/M_n$ | cis[b] | Tacticity[c] |
|---|---|---|---|---|
| 2 (cyclic) | 113 | 1.16 | >98 | Syndiotactic |
| 6 (linear) | 114 | 2.34 | >95 | Syndiotactic |

[a]Absolute molecular weights determined by SEC-MALS.
[b]Determined by $^1$H NMR spectroscopy.
[c]Determined by $^{13}$C NMR spectroscopy.

Figure 4:
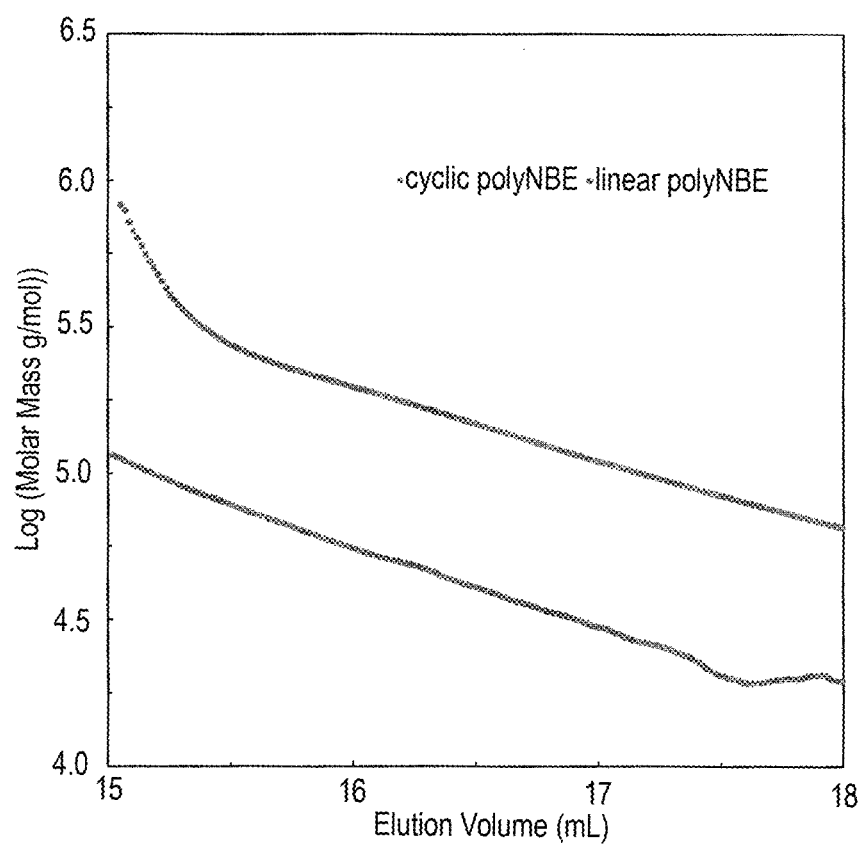
FIG. 4 shows plots of log molar mass verses elution volume for cyclic polynorbornene (top curve) prepared using complex 2, according to an embodiment of the invention, and linear polynorbornene prepared by a prior art method.
Figure 5:
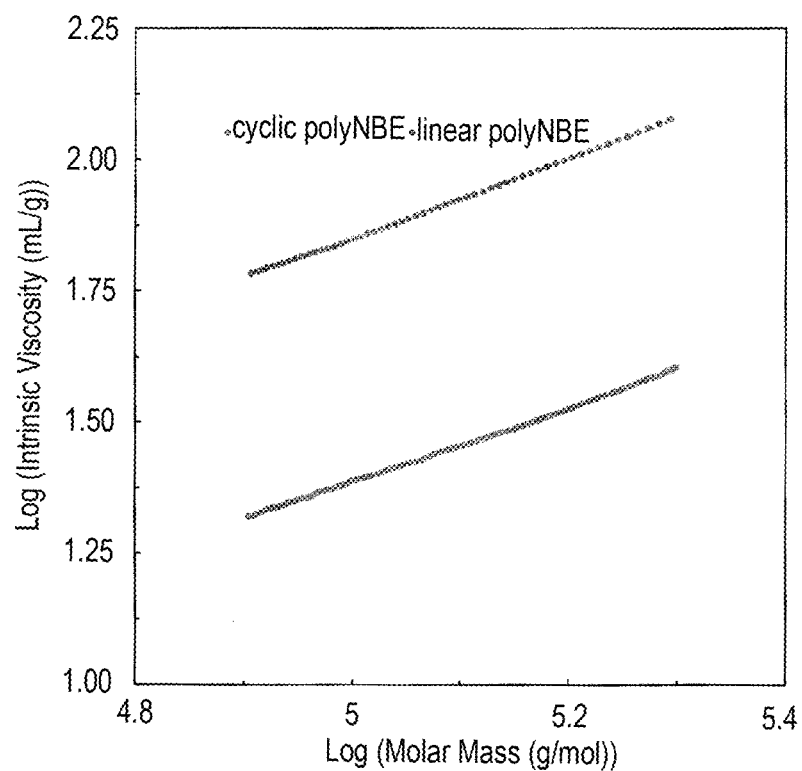
FIG. 5 shows plots of log intrinsic viscosity verses log molar mass for cyclic polynorbornene (bottom curve) prepared using complex 2, according to an embodiment of the invention, and linear polynorbornene prepared by a prior art method.
Figure 6:
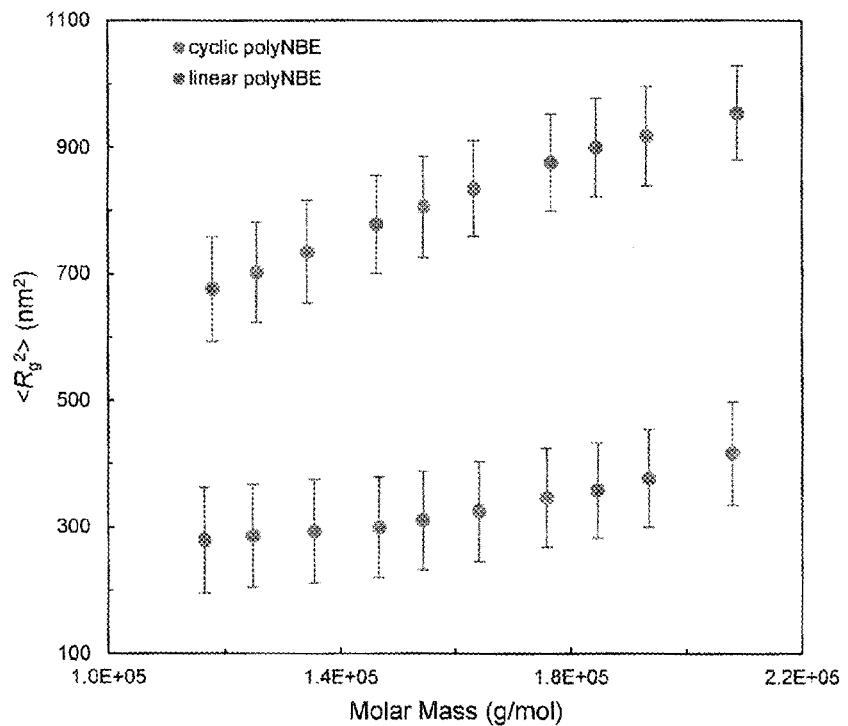
FIG. 6 shows plots of root mean square radius of gyration vs. molar mass for cyclic polynorbornene (bottom points) prepared using complex 2, according to an embodiment of the invention, and linear polynorbornene prepared by a prior art method.

A plot of log of molar mass versus elution volume is shown in FIG. 4, where the cyclic polynorbornene with the same molar mass elutes later than their linear counterparts, consistent with their smaller hydrodynamic volume. A Mark-Houwink-Sakurada (MHS) plot (log [η] versus log M, where [η] is the intrinsic viscosity and M is the viscosity-average molar mass, as indicated in FIG. 5, confirms the lower intrinsic viscosity of the cyclic polymers relative to the linear polymers. The experimental ratio [η]$_{cyclic}$/[η]$_{linear}$ of 0.34 over a range of molecular weights are in good agreement with the theoretical value of 0.4. MHS parameters a of 0.76 and 0.71 for the linear and cyclic samples, respectively, were determined from the slope of the MHS plots. This result indicates that both polymers behave as flexible random coils in solution, meaning the observed differences are caused by different topologies. In addition a plot of mean square radius of gyration (<$R_g^2$>) versus molar mass, as shown in FIG. 6, obtained for cyclic and linear samples of polynorbornene provides a <$R_g^2$>$_{cyclic}$/<$R_g^2$>$_{linear}$ ratio of 0.4±0.1, which is within the experimental error of the theoretical value of 0.5.

Tethering an alkylidene to a substitutionally inert ancillary ligand is an effective design for creating catalysts capable of REMP, as with catalyst 2, according to an embodiment of the invention. Unique to this system, $CO_2$ cleavage across the metal-carbon triple bond of complex 1 leads to the tethered alkylidene catalyst 2. Complex 2 is the first group VI alkylidene complex to function as a REMP catalyst. This catalyst produces cyclic polynorbornene with extremely high stereocontrol.

Figure 7:
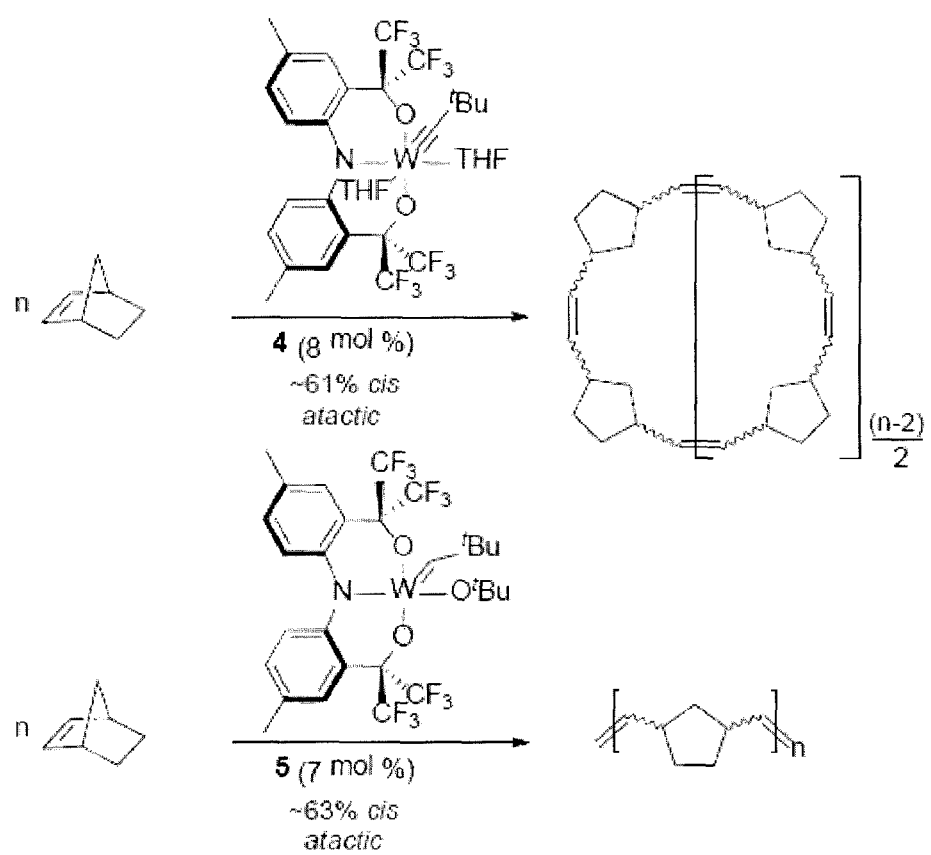
FIG. 7 shows reaction schemes for the nearly random polymerization of norbornene with complex 4, according to an embodiment of the invention, and a linear polymerization of norbornene with complex 5.
Figure 8:
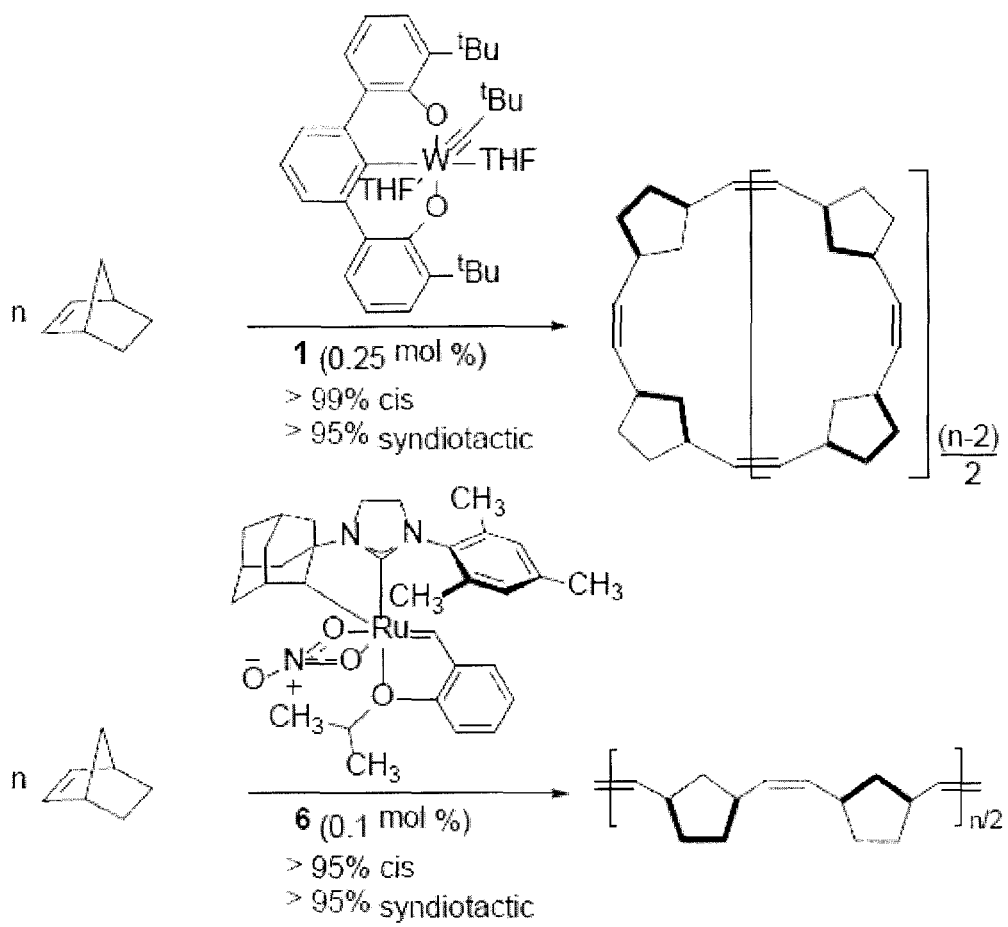
FIG. 8 shows reaction schemes for the stereoregular polymerization of norbornene with complex 1, according to an embodiment of the invention, and a linear polymerization of norbornene with Grubb's catalyst 6.
Figure 9:
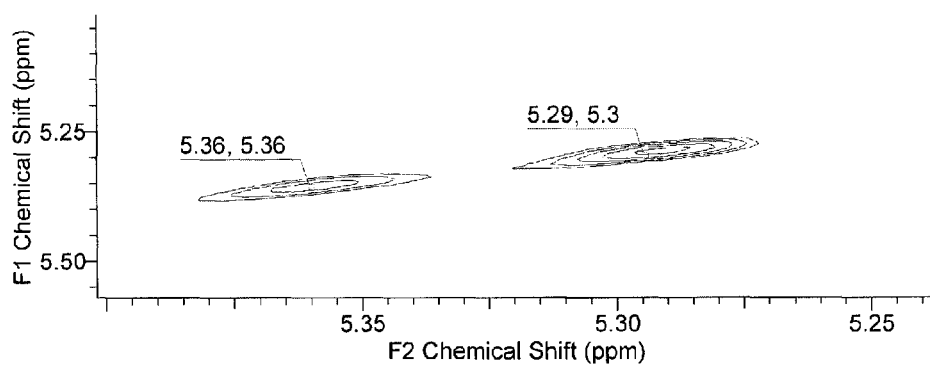
FIG. 9 shows a $^1H$-$^1H$ COSY NMR of poly(DCMNBD) using 1, according to an embodiment of the invention, as the catalyst in $CDCl_3$ at 500 MHz, expansion.

In another embodiment of the invention, complex 4 reacts slowly with norbornene to give non-stereoselective cyclic polynorbornene, as indicated in FIG. 7. Evidence for a cyclic topology comes from comparison of the cyclic polymers produced with initiator 4 versus linear non-stereoselective polymers produced with the ONO-trianionic pincer alkylidene [CF$_3$—ONO]W=CH$^t$Bu(O$^t$Bu) 5. Catalyst 4 differs from 5, as 4 contains an alkylidyne capable of ynene metathesis, whereas 5 contains an alkylidene. Complex 1 rapidly polymerizes norbornene at room temperature, as shown in FIG. 8. Treating a solution of norbornene in toluene with 1 (0.25 mol %) results in the quantitative formation of highly cis (>99%; $^1$H NMR) and syndiotactic (>95%; $^{13}$C NMR) cyclic polynorbornene within 30 min. Table 3 lists the results of polymerizations with initiator 1. Cyclic polynorbornene produced with initiator 1 is syndiotactic (>98%), as determined by $^{13}$C NMR. Polymerizing chiral dicarbomenthoxynorbornadiene (DCMNBD) with complex 1 confirms the assignment of a syndiotactic cyclic polymer. For DCMNBD with a cis/isotactic stereochemistry, the olefinic protons are inequivalent, and therefore couple in a $^1$H-$^1$H COSY NMR spectrum; whereas, in a cis/syndiotactic polymer, the olefinic protons are related by a C$_2$ axis and are equivalent, and thus do not couple. Poly(DCMNBD) produced by initiator 1 does not exhibit coupling between the olefinic protons, indicating the polymer is syndiotactic, as shown in FIG. 9.

TABLE 3

Polymerization of norbornene catalyzed by 1 under various monomer to catalyst loadings.

| [cat/mon]$_0^{[a]}$ | [monomer]$_0^{[b]}$ | Yield[e] (%) | % cis[c] | $M_n^{[d]}$ g/mol | $M_w/M_n^{[d]}$ |
|---|---|---|---|---|---|
| 1:100 | 0.1 | 80 | 94 | 118,000 | 1.26 |
| 1:200 | 0.1 | 83 | 95 | 79,800 | 1.22 |
| 1:400 | 0.1 | 80 | 94 | 91,500 | 1.32 |
| 1:400 | 0.05 | 99 | 99 | 425,000 | 1.45 |

[a]The appropriate amount of a 1 mg/mL solution of catalyst dissolved in toluene is added to 30 mg of norbornene dissolved in toluene and stirred for 30 min at room temperature.
[b]mol · L$^{-1}$.
[c]Determined by $^1$H NMR
[d]Determined by gel permeation chromatography (GPC) using THF as the mobile phase at 35° C.
[e]Determined gravimetrically.

Figure 10A:
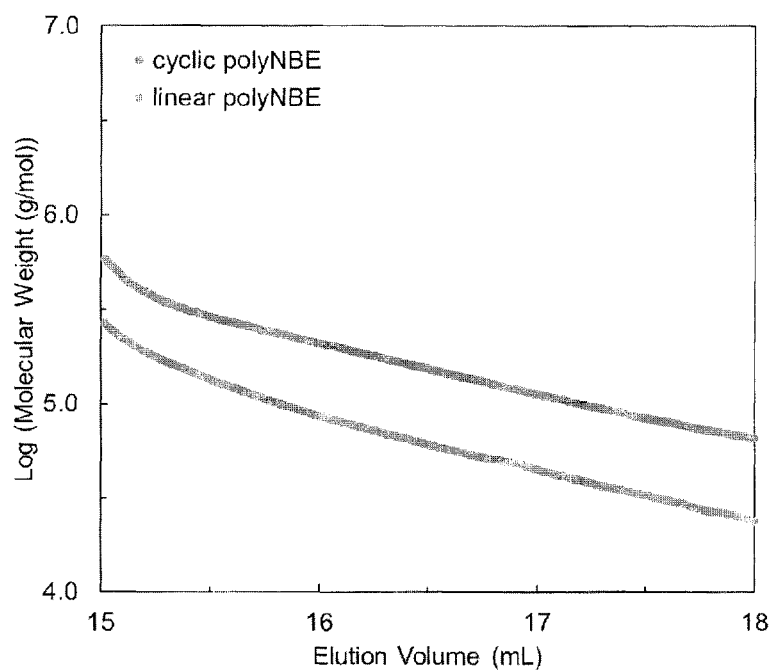
FIG. 10A shows a plot of log molecular mass versus elution volume for stereoregular cyclic polynorbornene synthesized by 1 (top curve), according to an embodiment of the invention, and linear polynorbornene synthesized by 6.
Figure 10B:
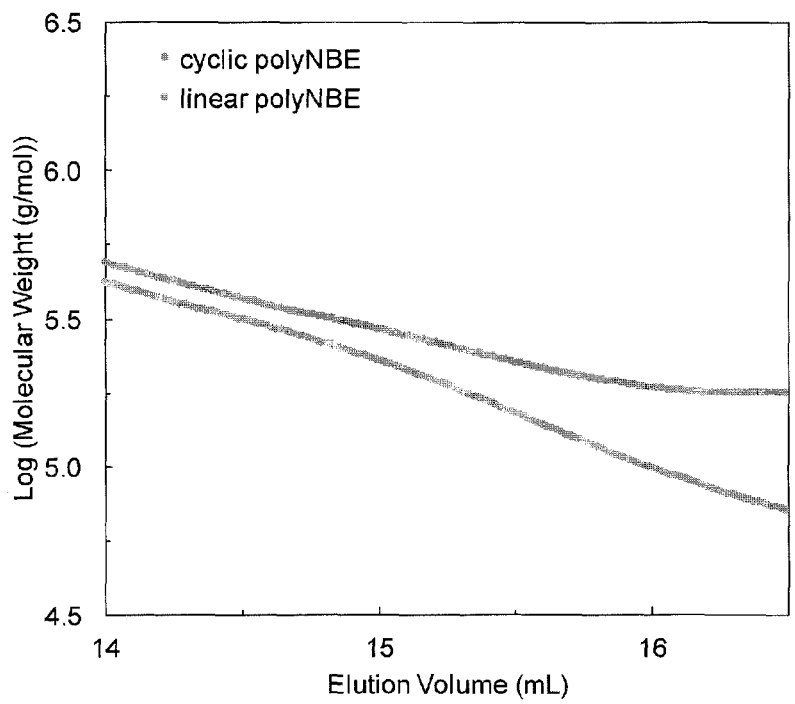
FIG. 10B shows a plot of log molecular mass versus elution volume for stereorandom cyclic polynorbornene synthesized by 4 (top curve), according to an embodiment of the invention, and linear polynorbornene synthesized by 5.

Linear polynorbornene, as indicated in Table 4, below, with a similarly high cis selectivity (95%) and syndiotacticity (>95%) was synthesized using the known ruthenium Grubbs catalyst 6, as shown in FIG. 8. Size exclusion chromatography (SEC) equipped with multi-angle light scattering (MALS) and viscosity detectors provide compelling data for a cyclic topology. Cyclic polymers have smaller hydrodynamic radii than their equivalent linear analogs. Consequently, cyclic polymers have a longer elution time for a given absolute molecular weight during SEC. The differences in the plot of the log of absolute molecular weights versus elution volume, as shown in FIG. 10A for cyclic and linear polymers from 1 and 6, respectively, and FIG. 10B for cyclic and linear polymers from 4 and 5, respectively, are consistent with linear versus cyclic polymers.

TABLE 4

$M_n$, $M_w/M_n$, cis-selectivity and tacticity of cyclic and linear polynorbornene.

| Catalyst | $M_n$ (g/mol)[a] | $M_w/M_n^{[a]}$ | % cis[b] | % syndiotacticl[c] |
|---|---|---|---|---|
| 1 (cyclic) | 125,000 | 1.22 | >99 | >95 |
| 6 (linear) | 114,000 | 2.34 | >95 | >95 |

[a]Determined by gel permeation chromatography (GPC) using THF as the mobile phase at 35° C.
[b]Determined by $^1$H NMR.
[c]Confirmed by $^1$H—$^1$H COSY NMR.

Figure 11A:
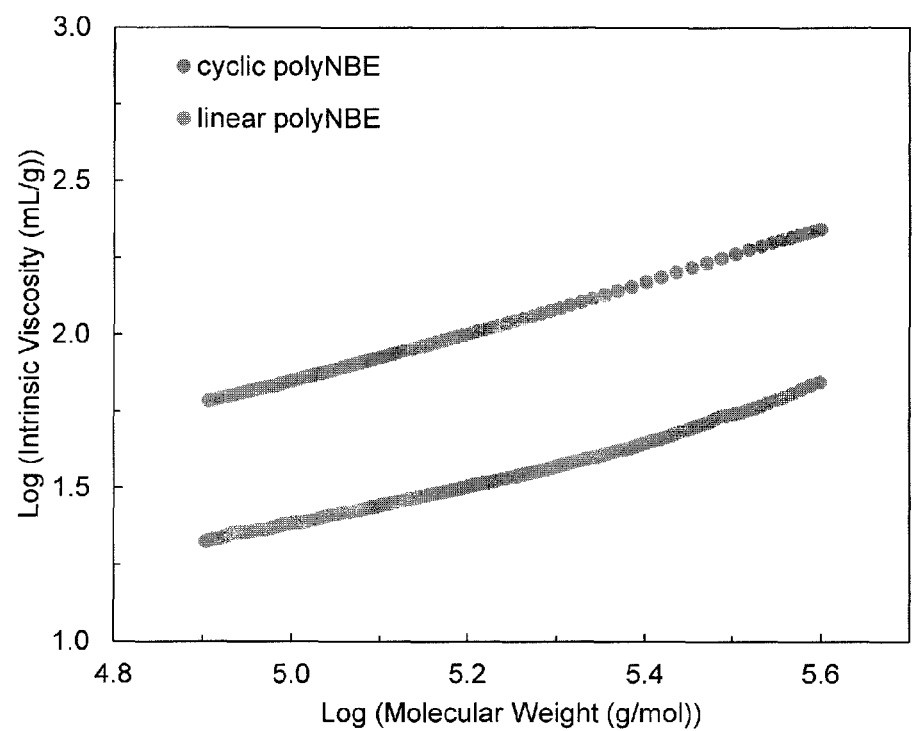
FIG. 11A shows a plot of intrinsic viscosity verses molar mass for stereoregular cyclic polynorbornene synthesized by 1 (bottom curve), according to an embodiment of the invention, and linear polynorbornene synthesized by 6.
Figure 11B:
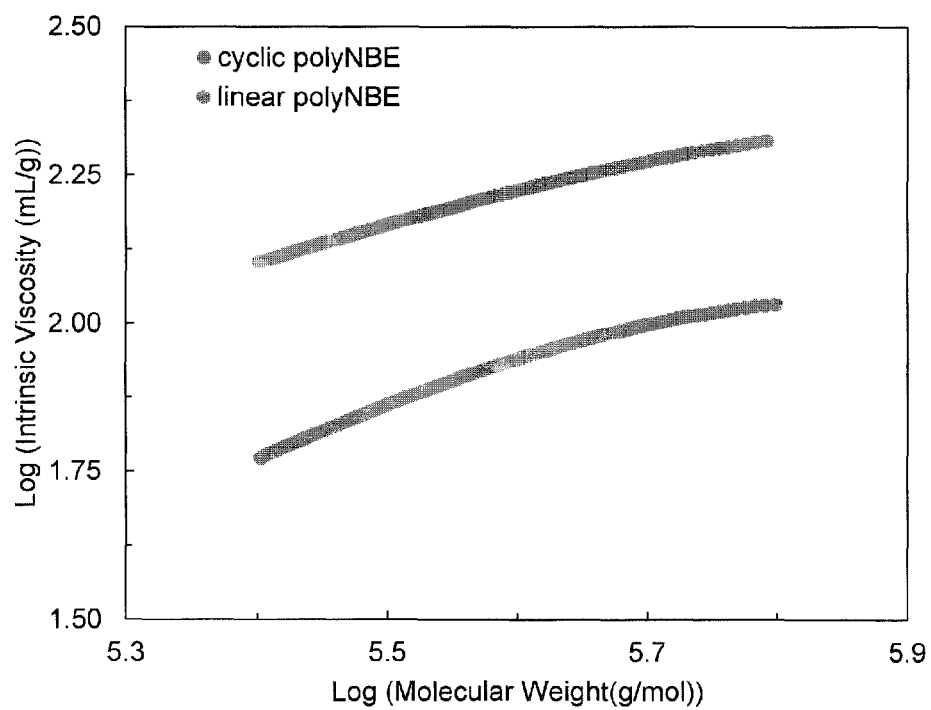
FIG. 11B shows a plot of log intrinsic viscosity verses log molar mass for stereorandom cyclic polynorbornene synthesized by 4 (bottom curve), according to an embodiment of the invention, and linear polynorbonene synthesized by 5.
Figure 12A:
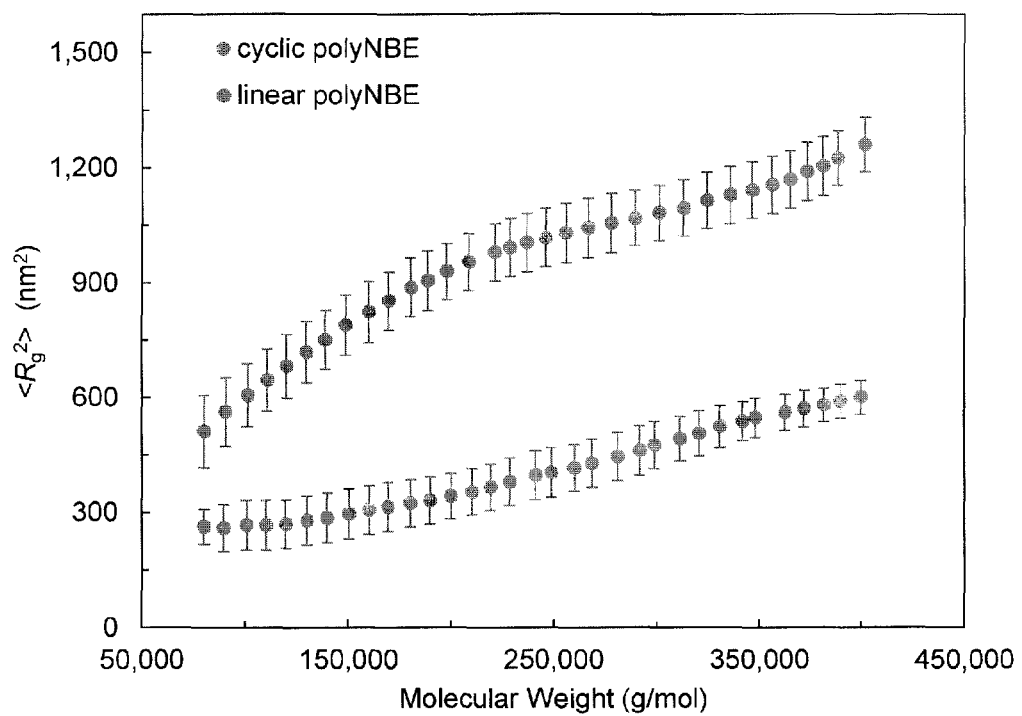
FIG. 12A shows a plot of root mean square radius of gyration vs. molar mass for stereoregular cyclic polynorbornene synthesized by 1 (bottom points), according to an embodiment of the invention, and linear polynorbonene synthesized by 6.
Figure 12B:
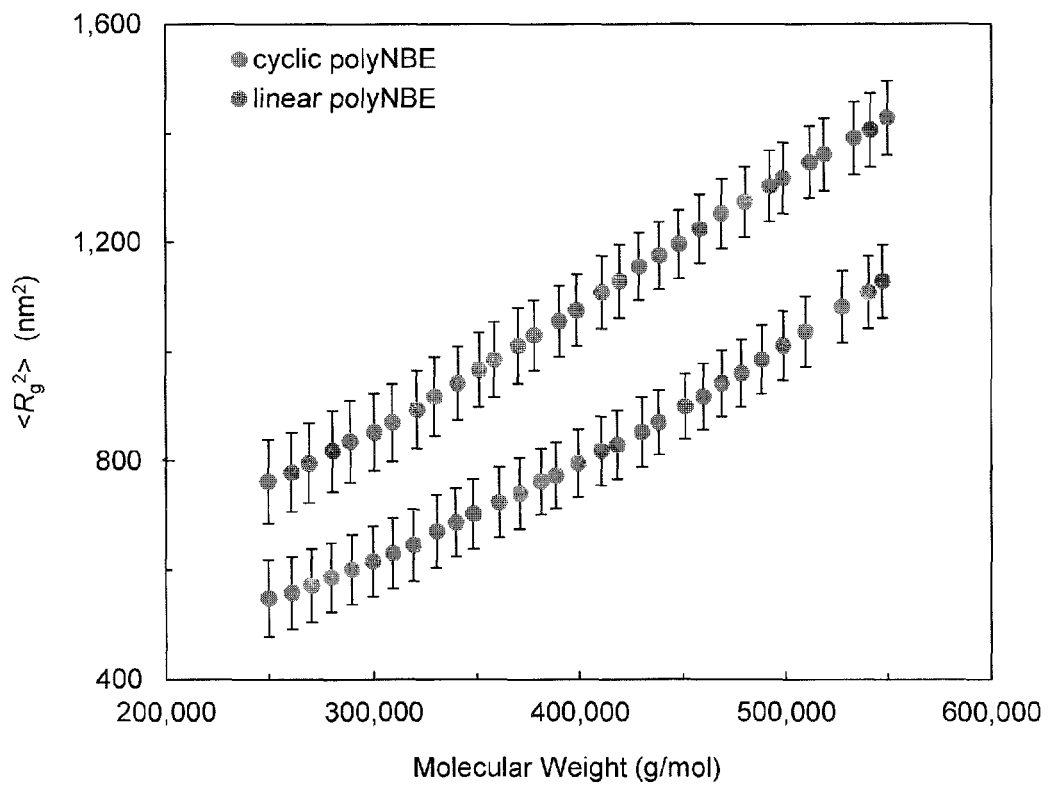
FIG. 12B shows a plot of root mean square radius of gyration vs. molar mass for stereorandom cyclic polynorbornene synthesized by 4 (bottom points), according to an embodiment of the invention, and linear polynorbornene synthesized by 5.

A Mark-Houwink-Sakurada (MHS) plot (log [η] versus log M, where [η] is the intrinsic viscosity and M is the viscosity-average molecular weight, is shown in FIG. 11A for cyclic and linear polymers from 1 and 6, respectively, and FIG. 11B for cyclic and linear polymers from 4 and 5, respectively, and confirms the lower intrinsic viscosity of the cyclic polymers relative to the linear sample. The Mark-Houwink parameter (a) values of 0.75 for the linear sample and 0.66 for the cyclic sample suggest that both behave as random coils in solution. The experimental ratio [η]$_{cyclic}$/[η]$_{linear}$ over a range of molecular weights agrees with the theoretical value of 0.4. The root mean square radius (RMS) of the two samples was measured. The cyclic polymers exhibited smaller <$R_g^2$> values for a wide range of molecular weights as compared to those of linear samples, and the experimentally determined ratio of $$\frac{<R_g^2>_{cyclic}}{<R_g^2>_{linear}} = 0.44 \pm 0.07$$

calculated over the range is within reasonable error limits of the theoretical value of 0.5, as indicated in FIG. 12A for cyclic and linear polymers from 1 and 6, respectively, and FIG. 12B for cyclic and linear polymers from 4 and 5, respectively.

Differential Scanning calorimetry (DSC) analyses of cyclic poly(NBE) synthesized by 1 (B) and linear poly (NBE) synthesized by 6 (A) were performed and the results indicate nearly identical glass transition temperatures ($T_g$) for the cyclic and linear poly(NBE). The similar thermal properties are the result of the relatively high molecular weights (>100,000 g/mol) of these polymers, which minimizes the potential end group effects.

In summary, $OCO^{3-}$ pincer ligands as in 1, or an $ONO^{3-}$ pincer ligand as with 4 can produce cyclic polymers by REMP, but with vastly different degrees of stereo-control. Table 5 below summarizes these differences.

TABLE 5

Properties of the polymers used for comparison.

| Catalyst | $M_n$ (g/mol)[a] | $M_w/M_n$[a] | % cis[b] | tacticity[c] |
| --- | --- | --- | --- | --- |
| 1 (cyclic) | 125,000 | 1.22 | >99 | >99% syndiotactic |
| 6 (linear) | 114,000 | 2.34 | >95 | >95% syndiotactic |
| 4 (cyclic) | 327,000 | 1.14 | 61 | atactic |
| 5 (linear) | 227,200 | 1.58 | 63 | atactic |

[a]Determined by gel permeation chromatography (GPC) using THF as the mobile phase at 35° C.
[b]Determined by $^1$H NMR.
[c]Confirmed by $^1$H—$^1$H COSY NMR.

Methods and Materials

Unless otherwise specified, all manipulations were performed under an inert atmosphere using glove-box techniques. $C_6D_6$ (Cambridge Isotopes) was dried over sodium-benzophenone ketyl, distilled or vacuum transferred and stored over 4 Å molecular sieves. Norbornene was refluxed over sodium, distilled and stored under argon. The tungsten-alkylidyne [OCO]W(≡C$^t$Bu)(THF)$_2$ 1 was prepared according to Veige et al. US Patent Application Publication No. 2014/0309389. The tungsten complexes [CF$_3$—ONO]W≡C$^t$Bu(THF)$_2$ 4 and [CF$_3$—ONO]W═CH$^t$Bu(O$^t$Bu) 5 were prepared according to Patent Application Publication No. 2014/0073800 and the monomer chiral dicarbomenthoxynorbornadiene (DCMNBD) was prepared according to Gonsales et al., *Journal of the American Chemical Society* 2016, 138, 4996-99. Linear cis-syndiotactic-polynorbornene (cis-poly(NBE)) was synthesized using the commercially available Grubbs catalyst purchased from Sigma-Aldrich (CAS 1352916-84-7) and used as received. Bromination of poly(NBE) was carried out according to the method of Hyvl et al., *Macromolecules* 2015, 48, 3148-52. $^1$H and $^{13}$C NMR spectra were obtained on Varian INOVA spectrometer (500 MHz), or a Mercury spectrometer (400 MHz and 300 MHz for proton). Chemical shifts, reported in δ (ppm), were referenced on the solvent, on the TMS scale for $^1$H and $^{13}$C. Elemental analyses were performed at Complete Analysis Laboratory Inc., Parsippany, N.J. Size-exclusion chromatography was performed in THF at 35° C. and a flow rate of 1.0 mL/min (Agilent isocratic pump, degasser, and autosampler; columns: three PLgel 5 μm MIXED-D mixed bed columns, molecular weight range 200-400,000 g/mol). Detection consisted of a Wyatt Optilab rEX refractive index detector operating at 658 nm, a Wyatt miniDAWN Treos light scattering detector operating at 656 nm, and a Wyatt ViscoStar-II viscometer. Absolute molecular weights and molecular weight distributions were calculated using the Wyatt ASTRA software. Electrospray ionization mass spectrometry (ESI-MS) spectra were collected by direct injection into an Agilent 6120 TOF spectrometer at a gas temperature of 350° C. with fragmentation voltage of 120 V. The sample was prepared in an argon glovebox and transported in Hamilton gastight syringes. Gas chromatography electron ionization mass spectrometry (GC/EI-MS) to identify CO was performed using a Restek Corp. Rxi-5MS column (30 m×0.25 mm i.d. and 0.25 μm df). A Finnigan Trace GC Ultra chromatograph was employed using split injection mode, with a split flow rate of 30 mL/min and a GC carrier gas flow of 1 mL/min, vacuum compensated. Temperature at the injection port was of 250° C., MS transfer line was at 225° C., and a temperature program of 35° C. Isothermal was utilized. A ThermoFinnigan (San Jose, Calif.) Finnigan Trace DSQ mass spectrometer was used with electron ionization (EI) of 70 eV, and ion source temperature of 250° C.

Synthesis of
2,3-Bis((menthyloxy)carbonyl)norbornadiene
(BMCNBD)

Figure 13:
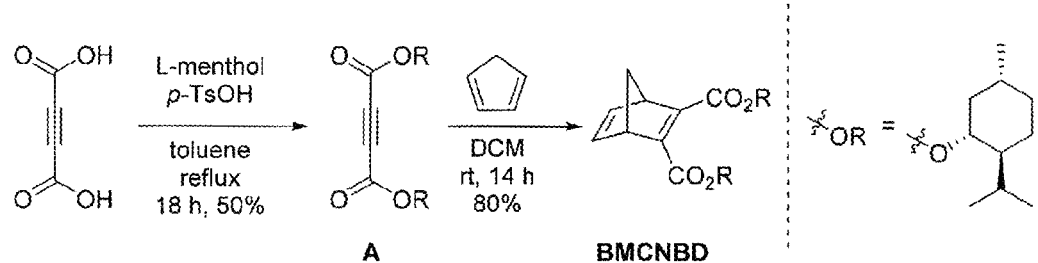
FIG. 13 is a reaction scheme for the preparation of BMCNBD.

Acetylene dicarboxylic acid (1.00 g, 8.77 mmol), (−)-menthol (3.43 g, 21.9 mmol, 2.50 equiv), p-toluenesulfonic acid (0.167 mg, 0.877 mmol, 0.100 equiv), and toluene (25 mL) were charged in a round-bottomed flask equipped with a Dean-Stark apparatus. The solution was heated under reflux for 18 h. The solution was cooled to rt, washed with water (20 mL×2) and brine (20 mL), dried (Na$_2$SO$_4$), filtered, and concentrated, and the crude material was purified by column chromatography (hexanes:EtOAc 40:1, R$_f$=0.2) to give the product dimenthyl acetylenedicarboxylate A as a white solid (1.72 g, 4.40 mmol, 50%), as indicated in FIG. 13.

Freshly prepared cyclopentadiene (0.42 mL, 5.1 mmol, 2.0 equiv) was added to a stirred solution of A (1.00 g, 2.56 mmol) in DCM (4 mL) at rt. After 14 h the solution was concentrated, and the crude material was purified by column chromatography (hexanes:EtOAc 20:1, R$_f$=0.3) and recrystallization (MeOH) to give BMCNBD as a white solid (935 mg, 2.04 mmol, 80%).

Synthesis of [OC$^{CO}$O]W(O)(THF) 2 and Dimer 3

Figure 14:
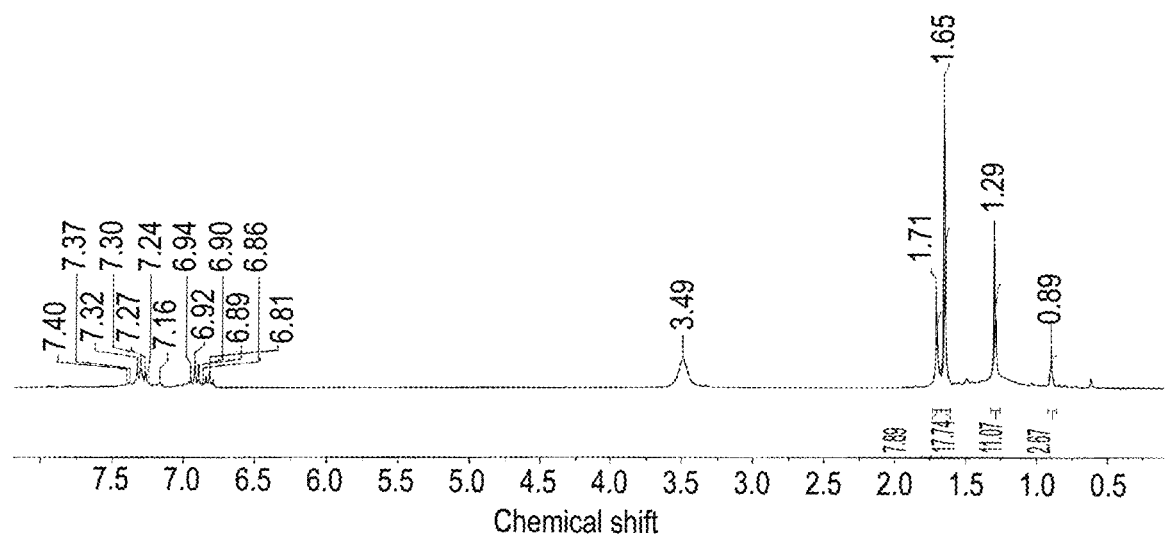
FIG. 14 shows a 500 MHz $^1H$ NMR spectrum of 2 and 3 as prepared without isolation in $C_6D_6$.

A J-Young NMR tube was charged with tungsten alkylidyne [OCO]W≡CC(CH$_3$)$_3$(THF)$_2$ (1) (0.050 g, 0.065 mmol) in C$_6$D$_6$. After performing a freeze-pump-thaw procedure to evacuate the headspace of the tube, 1 atm of CO$_2$ was admitted into it. Heating up the reaction up to 55° C. for 12 h generates the tungsten oxo alkylidene 2, along with complex 3 in a 9:2 ratio, respectively, and as indicated in the proton NMR spectrum shown in FIG. 14. The solvent was evaporated under reduced pressure yielding a red powder. 2 $^1$H NMR (C$_6$D$_6$, 500 MHz) δ (ppm): δ7.32 (d, 2H, Ar—H), 7.27 (m, 2H, Ar—H), 6.94 (d, 1H, Ar—H), 6.88 (m, 2H, Ar—H), 6.83 (m, 2H, Ar—H), 1.65 (s, 18H), 1.28 (s, 9H). $^{13}$C determined by $^1$H-$^{13}$C gHSQC and gHMBC experiments: (C$_6$D$_6$): δ=273.4 (s, W=Cα), 185.81 (s, W=CCO), 168.0 (s, Ar C), 144.5 (s, Ar C), 137.5 (s, Ar C), 134.9 (s, Ar C), 131.7 (s, Ar C), 130.0 (s, Ar C), 127.5 (s, Ar C), 126.6 (s, Ar C), 121.7 (s, Ar C), 121.3 (s, Ar C), 41.7 (s, W=CC(CH$_3$)$_3$), 34.8 (s, Ar—C(CH$_3$)$_3$), 31.7 (s, W=CC(CH$_3$)$_3$), 30.4 (s, Ar—C(CH$_3$)$_3$). Red crystals from complex 2 were obtained from a C$_6$D$_6$ solution of the reaction mixture, washed with pentane and dried. Asymmetric unit contains one molecule of benzene. Yield (0.020 g, >41%) Elemental analysis calcd. (%) for C$_{42}$H$_{50}$O$_5$W (818.70 g/mol): C, 61.62; H, 6.16; Found: C, 61.21; H, 5.93. HRMS (ESI-MS) m/z: [M+H]$^+$ Calcd for C$_{36}$H$_{45}$WO$_5$$^+$741.2771; Found 741.2754. The remaining mixture of 2 and 3 was then heated up for 10 days at 70° C. to provide complex 3 in quantitative yield. 3 $^1$H NMR (C$_6$D$_6$, 500 MHz) δ (ppm): δ7.39 (d, 2H, Ar—H), 7.33 (d, 2H, Ar—H), 7.26 (m, 2H, Ar—H), 7.17 (m, 1H, Ar—H), 6.86 (m, 2H, Ar—H), 1.71 (s, 18H), 0.90 (s, 9H). $^{13}$C determined by $^1$H-$^{13}$C gHSQC and gHMBC experiments: (C$_6$D$_6$): δ=280.9 (s, W=Cα), 168.7 (s, Ar C), 147.6 (s, Ar C), 138.8 (s, Ar C), 131.8 (s, Ar C), 131.0 (s, Ar C), 129.1 (s, Ar C), 128.6 (s, Ar C), 126.5 (s, Ar C), 124.8 (s, Ar C), 119.6 (s, Ar C), 45.1 (s, W=CC(CH$_3$)$_3$), 35.1 (s, Ar—C(CH$_3$)$_3$), 33.3 (s, W=CC(CH$_3$)$_3$), 30.4 (s, Ar—C(CH$_3$)$_3$). HRMS (ESI-MS) m/z: [M+H]$^+$ Calcd for C$_{62}$H$_{73}$W$_2$O$_6$$^+$ 1281.4435; Found 1281.4415; m/z [M+2H]$^{2+}$ Calcd for C$_{62}$H$_{74}$W$_2$O$_6$$^{2+}$ 641.2257; Found 641.2251.

Polymerization of Norbornene Using Complex 2

To a 20 mL glass vial charged with norbornene (0.038 g, 4.1×10$^{-4}$ mol, 100 equiv.) in 1 mL of toluene were added 3 mL of a 1 mg/mL solution of 2 in toluene (3 mg, 4.1×10$^{-6}$ mol, 1 equiv.). The reaction was allowed to stir for 7 h at room temperature. After this period the reaction vessel was brought outside the glovebox and the reaction mixture was added dropwise to stirring methanol. Polynorbornene precipitates out and is isolated by filtration, and dried overnight under vacuum. Yield (0.035 g, 92%). $^1$H and $^{13}$C NMR spectral assignments were consistent with literature reports.

Tacticity of the polynorbornene is consistent with the results of the post-functionalization of polynorbornene via bromination, as recently described by Schrock and coworkers. The brominated polymer exhibits two doublets at 3.84 ppm (J=11.2 Hz) and 3.81 ppm (J=10.3 Hz). Consistent with reported cis, syndiotactic polynorbornene, irradiating the methine protons at 2.61 ppm results in two singlets. Further evidence for high syndiotacticity comes from polymerization of the chiral monomer, bis((menthyloxy)carbonyl)norbornadiene (BMCNBD). COSY NMR is able to distinguish between isotactic and syndiotactic poly(BMCNBD). In the case of a cis isotactic sample, the olefinic protons are inequivalent, and therefore couple in a COSY NMR spectrum. However, a cis syndiotactic poly(BMCNBD) contains equivalent olefinic protons related by a C$_2$ axis, and thus do not couple. Poly(BMCNBD) produced by 2 does not exhibit any coupling between the olefinic protons, indicating the polymer is syndiotactic.

Polymerization of Norbornene Using Complex 3

To a 20 mL glass vial charged with norbornene (0.019 g, 2.0×10$^4$ mol, 100 equiv.) in 1 mL of toluene was added 3 (2.6 mg, 2.0×10$^{-6}$ mol, 1 equiv.) in 1 mL of toluene. The reaction was allowed to stir for 7 h at room temperature. After this period the reaction vessel was brought outside the glovebox and the reaction mixture was added dropwise to stirring methanol. Polynorbornene precipitates out and is isolated by filtration, and dried overnight under vacuum. Yield (0.008 g, 42%). A mixture of cis and trans polynorbornene was obtained. Tacticity was not determined.

Polymerization of Norbornene Using Grubb's Catalyst (6)

A solution of norbornene (0.580 g, 6.16×10$^{-3}$ mol, 1000 equiv.) in 30 mL of THF was added to a 100 mL round bottom flask containing a stirring bar. This solution was cooled to −40° C. and 50 μL of a stock solution (0.039 g in 0.5 mL of THF) of complex 6 (6.15×10$^{-6}$ mol, 1 equiv.) were added to it. The reaction was allowed to stir for 1 h at −40° C. After this period 0.1 mL of ethyl vinyl ether was used to quench the reaction, which was then added dropwise to stirring methanol. Polynorbornene precipitates out and is isolated by filtration, and dried under vacuum. Yield (0.221 g, 38%). $^1$H and $^{13}$C NMR spectral assignments were consistent with literature reports.

Polymerization of Norbornene by Catalyst 4

In a nitrogen filled glovebox, norbornene (32 mg, 3.4× 10$^{-4}$ mol, 12 equiv) was dissolved in 1 ml of C$_6$D$_6$ and transferred to a scaled NMR tube. In another vial 4 (26 mg, 2.8×10$^{-5}$ mol, 1.0 equiv) was dissolved in 1 mL of C$_6$D$_6$ and is added to the NMR tube. After 5 h the mixture was dissolved in a small amount of toluene (3 mL) and was added dropwise to stirring methanol. The mixture was allowed to stir for 30 min. Polynorbornene precipitates as a white solid and was isolated by filtration, and dried overnight under vacuum. (28 mg, 88%). $^1$H and $^{13}$C NMR spectral assignments were consistent with literature reports.

Polymerization of Norbornene by Catalyst 1

In a nitrogen filled glovebox, a 20 mL glass vial was charged with norbornene (30.0 mg, 3.19×10$^{-4}$ mol, 400 equiv) and dissolved in 5.76 mL of toluene. To the first solution a 1.0 mg/L solution of 1 (0.61 mL, 7.94×10$^{-7}$ mol, 1.0 equiv) was added. The reaction was stirred for 30 min at room temperature. After this period the reaction vessel was brought outside the glovebox and the reaction mixture was added dropwise to stirring methanol. The mixture was allowed to stir for 30 minutes. Polynorbornene precipitated as a white solid and was isolated by filtration and dried overnight under vacuum. Yield (29 mg, 97%). $^1$H and $^{13}$C NMR spectral assignments were consistent with literature reports. Other polymerization results are tabulated in Table 5, below.

TABLE 5

Polymerization of norbornene by catalyst 1 with different monomer/catalyst ratio and monomer concentration.

| [cat/mon]$_0$[a] | [monomer]$_0$[b] | Yield[e] (%) | % cis[c] | $M_n$[d] g/mol | $M_w/M_n$[d] |
|---|---|---|---|---|---|
| 1:100 | 0.1 | 80 | 94 | 118,000 | 1.26 |
| 1:200 | 0.1 | 83 | 95 | 79,800 | 1.22 |
| 1:400 | 0.1 | 80 | 94 | 91,500 | 1.32 |
| 1:400 | 0.05 | 99 | 99 | 425,000 | 1.45 |

[a]The appropriate amount of a 1 mg/mL solution of catalyst dissolved in toluene is added to 30 mg of norbornene dissolved in toluene and stirred for 30 min at room temperature.
[b]mol · L$^{-1}$.
[c]Determined by $^1$H NMR
[d]Determined by gel permeation chromatography (GPC) using THF as the mobile phase at 35° C.
[e]Determined gravimetrically.

Polymerization of Norbornene by Catalyst 5

In a nitrogen filled glovebox, norbornene (35 mg, 3.7× $10^{-4}$ mol, 15 equiv) was dissolved in 1 ml of $C_6D_6$ and transferred to a sealable NMR tube. In another vial, 5 (21 mg, 2.5×$10^{-5}$ mol, 1.0 equiv.) was dissolved in 1 mL of $C_6D_6$ and was added to the NMR tube. After 5 h the mixture was dissolved in a small amount of toluene (3 mL) and added dropwise to a stirring methanol solution. The polymer was then recovered by filtration (30 mg, 86%). $^1H$ and $^{13}C$ NMR spectral assignments were consistent with literature reports.

All patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A stereoregular cyclic polynorbornene consisting of repeating units having greater than 95% cis content and greater than 95% syndiotactic content.

2. The stereoregular cyclic polynorbornene according to claim 1, wherein the degree of polymerization is 3 to 100,000.

3. The stereoregular cyclic polynorbornene according to claim 1, wherein the stereoregular cyclic polynorbornene comprises double bonds and at least one of the double bonds is a reduced double bond.

4. The stereoregular cyclic polynorbornene according to claim 1, wherein the stereoregular cyclic polynorbornene is a reduced cyclic poly(norbornene), wherein the reduced cyclic poly(norbornene) is prepared by reduction of one or more double bonds of a cyclic poly(cycloalkene).

5. A method of preparing the stereoregular cyclic polynorbornene of claim 1, comprising
providing a catalytic initiator selected from a tetraanionic OCO pincer ligand supported metal-alkylidene complex, a trianionic OCO pincer ligand metal complex, or a trianionic ONO pincer ligand metal complex;
providing a plurality of norbornene monomers; and
combining the catalytic initiator with the norbonene monomers,
polymerizing the plurality of norbornene monomers into the stereoregular cyclic polynorbornene.

6. The method of claim 5, wherein the tetraanionic OCO pincer ligand metal-alkylidene complex has the structure:

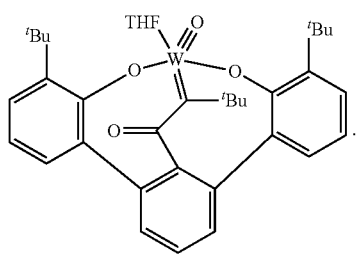

(2)

7. The method of claim 5, wherein the trianionic OCO pincer ligand metal complex has the structure:

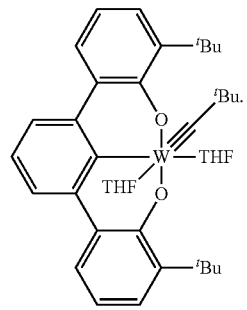

8. The method of claim 5, wherein the trianionic ONO pincer ligand metal complex has the structure:

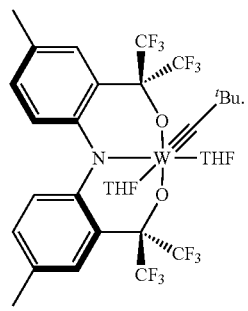

9. The method of claim 5, further comprising a step of reducing one or more double bonds of the stereoregular cyclic polynorbornene, thereby forming a macrocyclic poly(norbornane).

10. The method of claim 5, wherein the tetraanionic OCO pincer ligand supported metal-alkylidene complex has the structure selected from the group of:

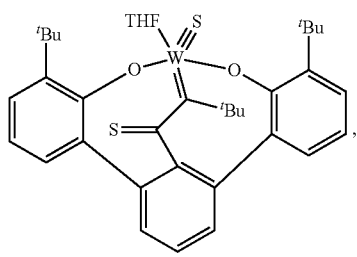

,

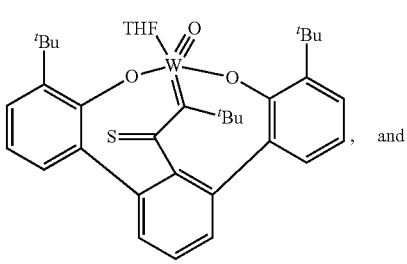

, and

-continued
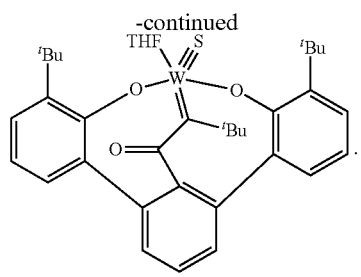
\* \* \* \* \*